US009501074B2

(12) United States Patent
Kim et al.

(10) Patent No.: US 9,501,074 B2
(45) Date of Patent: Nov. 22, 2016

(54) DYNAMIC CURRENT PULL-DOWN FOR VOLTAGE REGULATOR

(71) Applicant: TEXAS INSTRUMENTS INCORPORATED, Dallas, TX (US)

(72) Inventors: Donghwi Kim, Plano, TX (US); Patrick Michael Teterud, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 268 days.

(21) Appl. No.: 14/176,910

(22) Filed: Feb. 10, 2014

(65) Prior Publication Data

US 2015/0229124 A1 Aug. 13, 2015

(51) Int. Cl.
*H02H 9/02* (2006.01)
*G05F 1/571* (2006.01)

(52) U.S. Cl.
CPC .................................... *G05F 1/571* (2013.01)

(58) Field of Classification Search
USPC .......................................... 361/118; 323/282
See application file for complete search history.

(56) References Cited

U.S. PATENT DOCUMENTS 5,804,943 A * 9/1998 Kollman ............. H02M 3/3384 320/167
7,446,520 B2 * 11/2008 Hung .................... H02M 3/158 323/284
7,969,127 B1 * 6/2011 Megaw ................... G05F 1/613 323/226
7,982,445 B1 * 7/2011 Xin-LeBlanc ........ H02M 3/158 323/282
8,362,748 B2 * 1/2013 Miyanaga ........ G01R 19/16538 320/132
8,710,815 B2 * 4/2014 Feng ..................... H02M 3/156 323/271
2007/0176588 A1 * 8/2007 Nishida ................. H02M 3/158 323/284
2009/0072626 A1 * 3/2009 Watanabe ........... H02M 3/1588 307/85
2009/0174340 A1 * 7/2009 Kumagai ............. H02M 3/155 315/291
2010/0253301 A1 * 10/2010 Nakada ................... H02M 1/08 323/282
2011/0140678 A1 * 6/2011 Yee ..................... H02M 3/1588 323/282
2014/0084888 A1 * 3/2014 Kim ...................... H02M 3/157 323/283
2014/0266110 A1 * 9/2014 Yuan ..................... H02M 3/156 323/282

* cited by examiner

*Primary Examiner* — Thienvu Tran
*Assistant Examiner* — Angela Brooks
(74) *Attorney, Agent, or Firm* — William B. Kempter; Charles A. Britt; Frank D. Cimino

(57) ABSTRACT

A circuit includes a comparator that monitors a transient with respect to a predetermined threshold at the output of a voltage regulator and generates a compensation signal if the transient exceeds the predetermined threshold. A dynamic current pull-down block is triggered from the compensation signal of the comparator and operative with an output stage of the voltage regulator to mitigate the transient at the output of the voltage regulator by concurrently activating a plurality of current pull-down switches during the transient and sequentially deactivating each current pull-down switch of the plurality of current pull-down switches after its predetermined deactivation delay for each current pull-down switch.

18 Claims, 4 Drawing Sheets

DYNAMIC CURRENT PULL-DOWN FOR VOLTAGE REGULATOR

TECHNICAL FIELD

This disclosure relates to a voltage regulator circuit, and more particularly to a voltage regulator circuit that employs a dynamic current pull-down block to mitigate transients at the output of the voltage regulator.

BACKGROUND

In electronics, a linear regulator is a device used to maintain a steady voltage. The resistance of the regulator varies in accordance with the load resulting in a constant output voltage. The regulating device is made to act like a variable resistor, continuously adjusting a voltage divider network to maintain a constant output voltage, and continually dissipating the difference between the input and regulated voltages as heat. Linear regulators may place the regulating device between the source and the regulated load (a series regulator), or may place the regulating device in parallel with the load (shunt regulator). Simple linear regulators may only contain a Zener diode and a series resistor whereas more complicated regulators include separate stages of a voltage reference, an error amplifier and a power pass element. Since linear voltage regulators are a common element of many devices, integrated circuit regulators are very common.

A pass transistor (or other device) is used as one half of a potential divider to establish the regulated output voltage for the linear regulator. The output voltage is compared to a reference voltage to produce a control signal to the transistor which will drive its gate or base. With negative feedback and suitable compensation selection, the output voltage is kept reasonably constant. Linear regulators are often inefficient since the pass transistor acting like a resistor wastes electrical energy by converting it to heat. The same regulating function can often be performed more efficiently by a switched-mode power supply, however a linear regulator may be preferred for light loads or where the desired output voltage approaches the source voltage. In these cases, the linear regulator may dissipate less power than a switching regulator. The linear regulator also has the advantage of not requiring magnetic devices (inductors or transformers) which can be relatively expensive or bulky.

One issue with linear regulator circuits is how they respond to line and/or load transients. One common technique is to monitor the output voltage of the regulator with a comparator. If a transient is sensed at the output by the comparator, an active device on the output of the regulator is turned on to sink current from the output and reduce the magnitude of the transient. Such output sinking techniques require a large die area for the active device to ensure the device can handle the power required during transient conditions. Such devices increase the size and cost of integrated circuit regulators which is an undesirable design goal for the regulator.

SUMMARY

This disclosure relates to a voltage regulator circuit that employs a dynamic current pull-down block to mitigate transients at the output of the voltage regulator. In one aspect, a circuit includes a comparator that monitors a transient with respect to a predetermined threshold at the output of a voltage regulator and generates a compensation signal if the transient exceeds the predetermined threshold. A dynamic current pull-down block is triggered from the compensation signal of the comparator and operative with an output stage of the voltage regulator to mitigate the transient at the output of the voltage regulator by concurrently activating a plurality of current pull-down switches during the transient and sequentially deactivating each current pull-down switch of the plurality of current pull-down switches after its predetermined deactivation delay for each current pull-down switch.

In another aspect, a circuit includes an error amplifier to generate an error output voltage with respect to an input reference voltage of a voltage regulator. An output stage receives the error output voltage of the error amplifier and generates a control signal for the voltage regulator. A pass device supplies a regulated output voltage to an output of the voltage regulator in response to the control signal received from the output stage. A comparator monitors a transient with respect to a predetermined threshold at the output of the voltage regulator and generates a compensation signal if the transient exceeds the predetermined threshold. A dynamic current pull-down block is triggered from the compensation signal of the comparator and operative with the output stage to mitigate the transient at the output of the voltage regulator by concurrently activating a plurality of current pull-down switches during the transient and sequentially deactivating each current pull-down switch of the plurality of current pull-down switches after its predetermined deactivation delay for each current pull-down switch.

In another aspect, an integrated circuit includes an error amplifier to generate an error output voltage with respect to an input reference voltage of a voltage regulator. An output stage receives the error output voltage of the error amplifier and generates a control signal for the voltage regulator. A switching device supplies a regulated output voltage to an output of the voltage regulator in response to the control signal received from the output stage. A comparator monitors a transient with respect to a predetermined threshold at the output of the voltage regulator and generates a compensation signal if the transient exceeds the predetermined threshold. A first dynamic current pull-down block is triggered from the compensation signal of the comparator and operative with the output stage to mitigate the transient at the output of the voltage regulator. A second dynamic current pull-down block is triggered from the compensation signal of the comparator and operative with the error amplifier to mitigate the transient at the output of the voltage regulator. Each of the first and second dynamic current pull-down blocks activate a plurality of current pull-down switches during the transient and sequentially deactivate each current pull-down switch of the plurality of current pull-down switches after its predetermined deactivation delay for each current pull-down switch.

DETAILED DESCRIPTION

This disclosure relates to a voltage regulator circuit that employs a dynamic current pull-down block to mitigate transients at the output of the voltage regulator. Load and/or line transients are monitored at the output of a voltage regulator circuit by a comparator that monitors regulator output voltage with respect to a predetermined threshold. If the regulator output voltage exceeds the threshold during a transient voltage condition, the comparator generates a compensation signal that triggers one or more dynamic pull-down blocks that are located upstream from the regulator output to dynamically mitigate the effects of the transient. The dynamic pull-down blocks operate to sink current from one or more control elements within the regulator and upstream from the regulator output which has the effect of reducing the magnitude of the transient voltage at the output. Rather than sinking current at the output of the regulator via an area-consuming and power sinking device as conventional circuits employ, the dynamic current pull-down blocks sink current at one or more locations preceding a pass device that supplies the output of the regulator. In this manner, transients can be reduced in a low-power and controlled manner which reduces the integrated circuit area of the regulator by eliminating the need for a power sinking device at the regulator output.

The dynamic current pull-down block can include a plurality of switches that are activated concurrently to sink current within the regulator when a transient condition has been detected by the comparator at the regulator output. Each switch in the pull-down block can be deactivated in a sequential manner via a predetermined delay set for each switch that gradually reduces the amount of the overall current being sunk by the dynamic current pull-down block over time. Thus, the dynamic current pull-down block generates a staircase current waveform of ever decreasing amounts of sink current. By sequentially deactivating each current pull-down switch in the dynamic current pull-down block, output transients can be reduced in a controlled and low-power manner.

Figure 1:
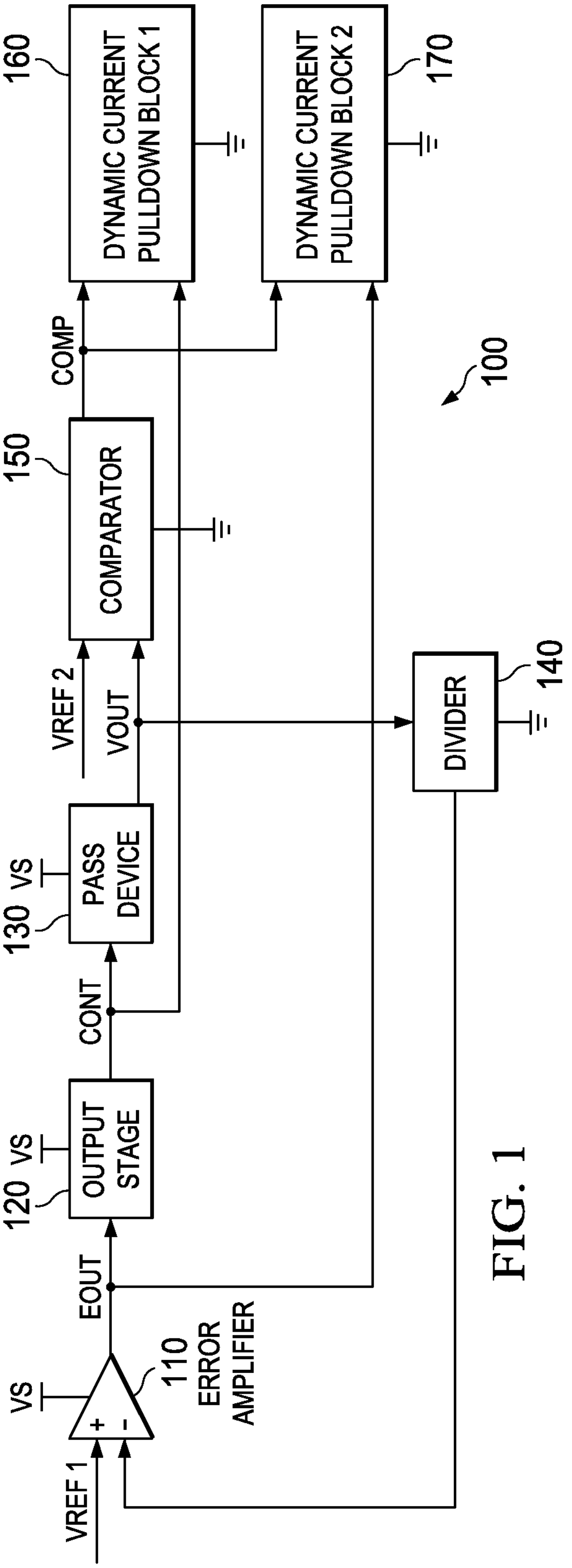
FIG. 1 illustrates an example of schematic block diagram of a voltage regulator circuit that employs a dynamic current pull-down block to mitigate transients at the output of the voltage regulator.

FIG. 1 illustrates an example of schematic block diagram of a voltage regulator circuit 100 that employs a dynamic current pull-down block to mitigate transients at the output of the voltage regulator. As used herein, the term circuit can include a collection of active and/or passive elements that perform a circuit function such as a voltage regulator. The term circuit can also include an integrated circuit where all the circuit elements are fabricated on a common substrate, for example. The circuit 100 includes an error amplifier 110 to generate an error output voltage (EOUT) with respect to an input reference voltage (VREF 1) of the voltage regulator circuit. An output stage 120 receives the error output voltage EOUT of the error amplifier 110 and generates a control signal (CONT) for the voltage regulator circuit 100. The output stage 120 can include amplifiers, gates, transistors (FET or junction), and/or current sources configured to generate the control signal CONT. A pass device 130 (e.g., FET or junction transistor responsive to the control signal) supplies a regulated output voltage (VOUT) to an output of the voltage regulator in response to the control signal CONT received from the output stage 120.

As shown, the error amplifier 110, the output stage 120, and the pass device 130 can be powered from an input voltage source (VS). In some examples, the voltage source VS can be the same voltage potential and in other examples, each source VS can be a different voltage potential. A divider 140 (e.g., resistive voltage divider) samples VOUT and feeds back the sampled output voltage to an input of the error amplifier 120 to generate EOUT and regulate the output voltage VOUT with respect to the reference voltage VREF 1. A comparator 150 monitors a transient (e.g., line and/or load voltage transient) with respect to a predetermined threshold (VREF 2) at the output of the voltage regulator circuit 100 and generates a compensation signal (COMP) if the transient exceeds the predetermined threshold.

In one example for mitigating transients, a first dynamic current pull-down block 160 can be triggered from the compensation signal COMP of the comparator 150 and is operative with the output stage 120 to mitigate the transient at the output of the voltage regulator. In this example, the dynamic pull-down block 160 generates a sequentially timed series of switches that sink current from the output stage 120 and mitigate the effects of the transient affecting the regulated output voltage VOUT.

In an alternative example, a second dynamic current pull-down block 170 can be triggered from the compensation signal of the comparator and operative with the error amplifier 110 to mitigate the transient at the output of the voltage regulator circuit 100. In this example, each of the first and second dynamic current pull-down blocks 160 and 170 respectively activate a plurality of current pull-down switches during the transient and sequentially deactivate each current pull-down switch of the plurality of current pull-down switches in each block after a predetermined deactivation delay for each current pull-down switch. In another example for mitigating transients, only the first dynamic current pull-down block 160 may be employed to mitigate transients at the output of the voltage regulator circuit 100. In another example, both the first dynamic pull-down block 160 and the second dynamic current pull-down block 170 each are employed to concurrently mitigate output transients by respectively sinking current at the output of the error amplifier 110 and the output of the output stage 120. In yet another example for mitigating transients, the second dynamic current pull-down block 170 can be replaced by a switch (not shown) that is activated by the comparator COMP signal and sinks current during the duration of the transient.

As will be illustrated and described below with respect to FIGS. 3, 4, and 5, the dynamic current pull-down blocks 160 and 170 can include a plurality of switches that are activated concurrently to sink current within the regulator (e.g., at the output of the error amplifier 110 and/or output stage 120) when a transient condition has been detected by the comparator 150 at the regulator output. Each switch in the pull-down block 160 or 170 can be deactivated in a sequential manner via a predetermined delay set for each switch that gradually reduces the amount of the overall current being sunk by the dynamic current pull-down block over time. The dynamic current pull-down blocks 160 and 170 generate a staircase current waveform of ever decreasing amounts of sink current. By sequentially deactivating each current pull-down switch in the dynamic current pull-down block 160 and/or 170, output transients can be reduced in a controlled and low-power manner.

Figure 2:
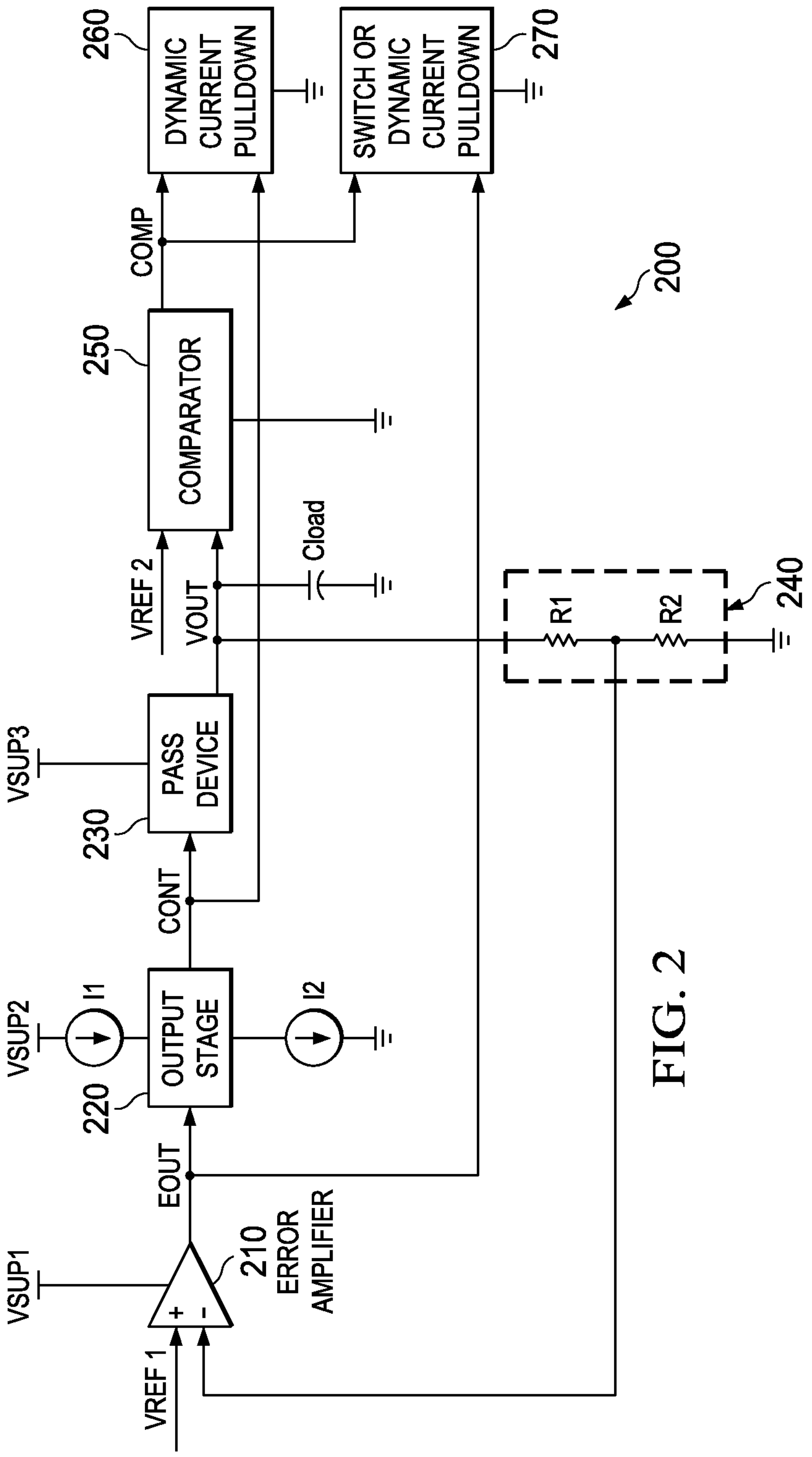
FIG. 2 illustrates an example of a voltage regulator circuit that employs a dynamic current pull-down block to mitigate transients at the output of the voltage regulator.

FIG. 2 illustrates an example of a voltage regulator circuit 200 that employs a dynamic current pull-down block to mitigate transients at the output of the voltage regulator. The circuit 200 includes an error amplifier 210 to generate an error output voltage (EOUT) with respect to an input reference voltage (VREF 1) of the voltage regulator circuit. An output stage 220 receives the error output voltage EOUT of the error amplifier 210 and generates a control signal (CONT) for the voltage regulator circuit 200. In this example, current sources I1 and I2 may be coupled to the output stage 220. A pass device 230 (e.g., FET or junction transistor) supplies a regulated output voltage (VOUT) to an output of the voltage regulator in response to the control signal CONT received from the output stage 220.

The error amplifier 210, the output stage 220, and the pass device 230 can be powered from an input voltage sources shown as VSUP 1, VSUP2, and VSUP 3, respectively. In some examples, the voltage sources can be the same voltage potential and in other examples, each source voltage source can be a different voltage potential. A divider 240 can be resistive voltage divider of R1 and R2 samples VOUT and feeds back the sampled output voltage to an input of the error amplifier 220 to generate EOUT and regulate the output voltage VOUT with respect to the reference voltage VREF 1. A comparator 250 monitors a transient (e.g., line and/or load voltage transient) with respect to a predetermined threshold (VREF 2) at the output of the voltage regulator circuit 200 and generates a compensation signal (COMP) if the transient exceeds the predetermined threshold.

In one example for mitigating transients, a first dynamic current pull-down block 260 can be triggered from the compensation signal COMP of the comparator 250 and is operative with the output stage 220 to mitigate the transient at the output of the voltage regulator. In this example, the dynamic current pull-down block 260 generates a sequentially timed series of switches that sink current from the output stage 220 and mitigate the effects of the transient affecting the regulated output voltage VOUT.

In an alternative example, a second dynamic current pull-down block 270 can be triggered from the compensation signal of the comparator and operative with the error amplifier 210 to mitigate the transient at the output of the voltage regulator circuit 200. In this example, each of the first and second dynamic current pull-down blocks 260 and 270 respectively activate a plurality of current pull-down switches during the transient and sequentially deactivate each current pull-down switch of the plurality of current pull-down switches in each block after a predetermined deactivation delay for each current pull-down switch. In another example for mitigating transients, only the first dynamic current pull-down block 260 may be employed to mitigate transients at the output of the voltage regulator circuit 200. In another example, both the first dynamic pull-down block 260 and the second dynamic pull-down block 270 each are employed to concurrently mitigate output transients by respectively sinking current at the output of the error amplifier 210 and the output of the output stage 220. In yet another example for mitigating transients, the second dynamic pull-down block 270 can be replaced by a switch that is activated by the comparator COMP signal and sinks current during the duration of the transient. As shown, a load capacitance Cload can be coupled to smooth VOUT.

As will be illustrated and described below with respect to FIGS. 3, 4, and 5, the dynamic current pull-down blocks 260 and 270 can include a plurality of switches that are activated concurrently to sink current within the regulator (e.g., at the output of the error amplifier 210 and/or output stage 220) when a transient condition has been detected by the comparator 250 at the regulator output. Each switch in the pull-down block 260 or 270 can be deactivated in a sequential manner via a predetermined delay set for each switch that gradually reduces the amount of the overall current being sunk by the dynamic current pull-down block over time. The dynamic current pull-down blocks 260 and 270 generate a staircase current waveform of ever decreasing amounts of sink current. By sequentially deactivating each current pull-down switch in the dynamic current pull-down block 260 and/or 270, output transients can be reduced in a controlled and low-power manner.

Figure 3:
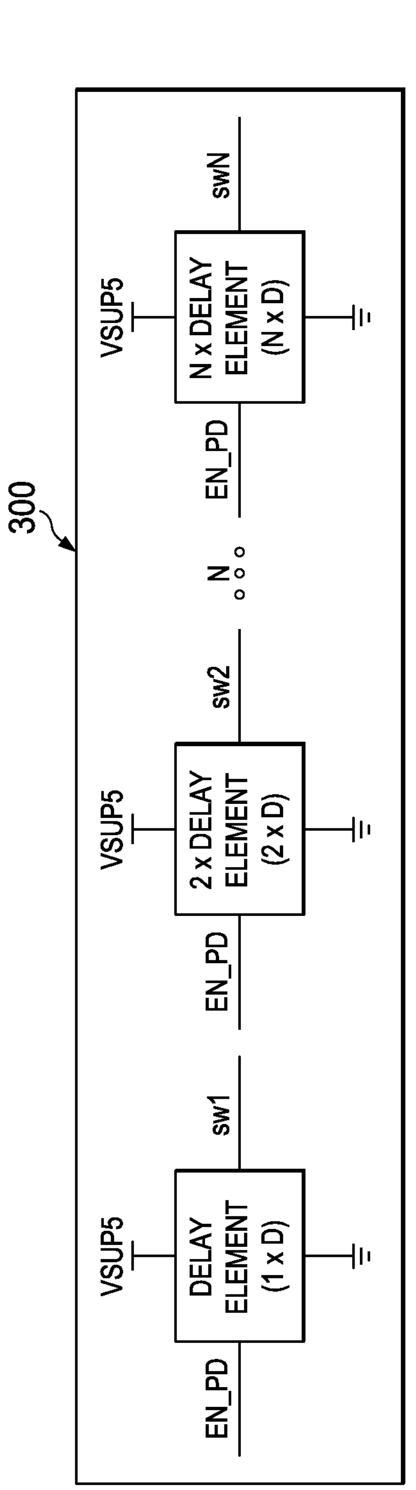
FIG. 3 illustrates an example of a schematic block diagram for a sequential switching configuration for a dynamic current pull-down block that is employed to mitigate transients at the output of a voltage regulator.

FIG. 3 illustrates an example of a schematic block diagram for a sequential switching configuration for a dynamic current pull-down block 300 that is employed to mitigate transients at the output of a voltage regulator. The block 300 includes N switching elements shown as SW1, SW2, and SWN, with N being a positive integer. Each switching element of the block is configured with a delay element. For example, the SW1 block is configured with a delay of 1×D, SW2 is configured with a delay of 2×D, whereas switch SWN is configured with a delay of N×D.

When a transient is encountered in the voltage regulator, each switch in the block 300 is turned on to generate a maximum sink current for the entire block and to counteract the peak of the transient. Overtime, the respective delay elements associated with each switch sequentially deactivates each switch. For example, SW1 with the shortest delay turns off first and then SW2 turns off, and so forth. The sequential deactivation of switches gradually and dynamically reduces the pull-down sink current for the block 300 over time until all the switches in the blocks have been deactivated.

Figure 4:
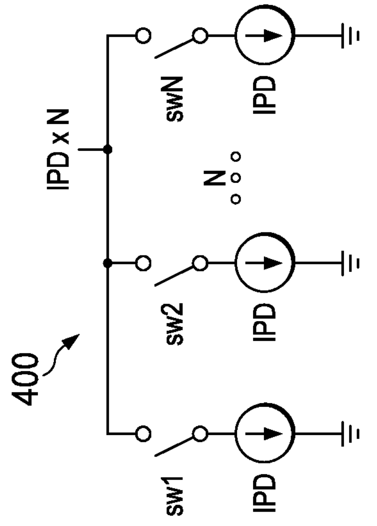
FIG. 4 illustrates an example of a circuit for a sequential switching configuration for a dynamic current pull-down block that is employed to mitigate transients at the output of a voltage regulator.

FIG. 4 illustrates an example of a circuit for a sequential switching configuration for a dynamic current pull-down block 400 that is employed to mitigate transients at the output of a voltage regulator. In this example, when each switch is active, each switch sinks a value of current labeled as IPD with the total current sunk for the block at the moment of the transient being N×IPD since all switches in the block are activated when the transient is detected. As each switch is deactivated via the delay elements described above, the total sink current for the block decreases by IPD as each switch is deactivated. This has the effect of generating a staircase current waveform over time representing an ever decreasing amount of sink current of the block 400.

Figure 5:
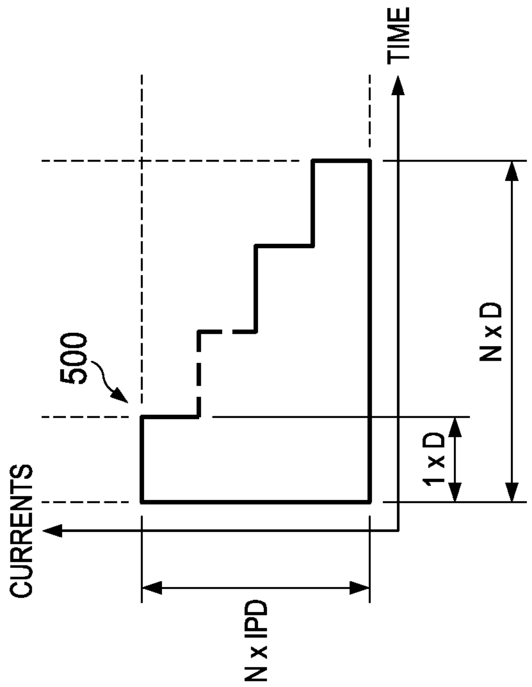
FIG. 5 illustrates an example staircase current waveform for the sequential switching configurations depicted in FIGS. 3 and 4.

FIG. 5 illustrates an example staircase current waveform 500 for the Sequential switching configurations depicted in FIGS. 3 and 4. As shown, the peak current sunk on the vertical axis is N×IPD. As time passes along the vertical axis, shown as 1×D increments, the total sink current decreases at each step by IPD.

Figure 6:
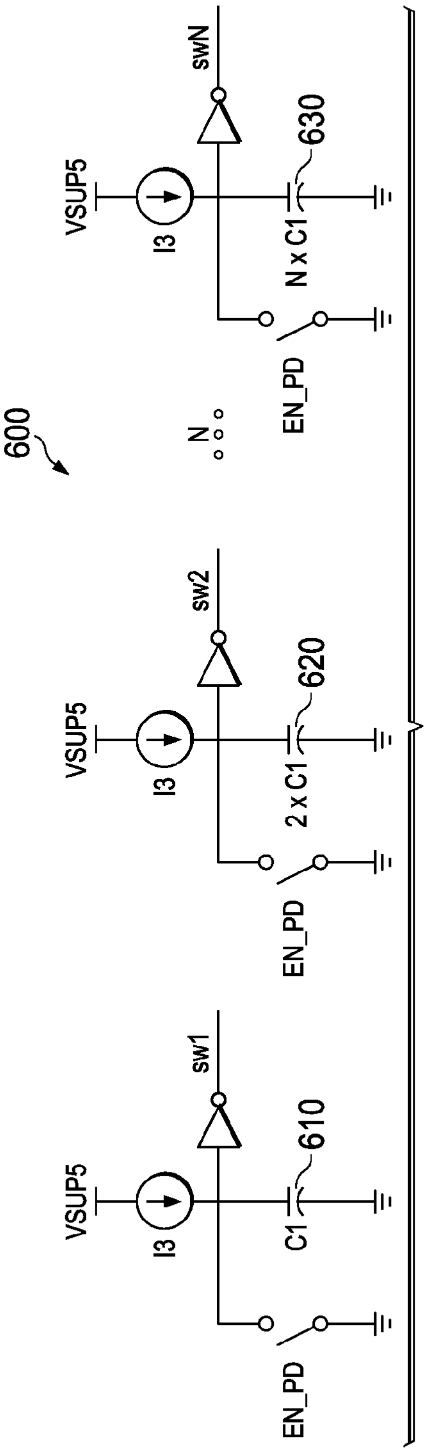
FIG. 6 illustrates an example of a delay circuit for a sequential switching configuration for a dynamic current pull-down block that is employed to mitigate transients at the output of a voltage regulator.

FIG. 6 illustrates an example of a delay circuit for a sequential switching configuration for a dynamic current pull-down block 600 that is employed to mitigate transients at the output of a voltage regulator. The block 600 includes N switching circuits shown as SW1 though SWN, with N being a positive integer. The time delay for each circuit is controlled by a capacitor. At 610, the time delay is set by a capacitance value denoted as C1. At 620, the time delay is set by a capacitance value denoted as 2×C1. At 630, the time delay is set by a capacitance value denoted as N×C1.

Figure 7:
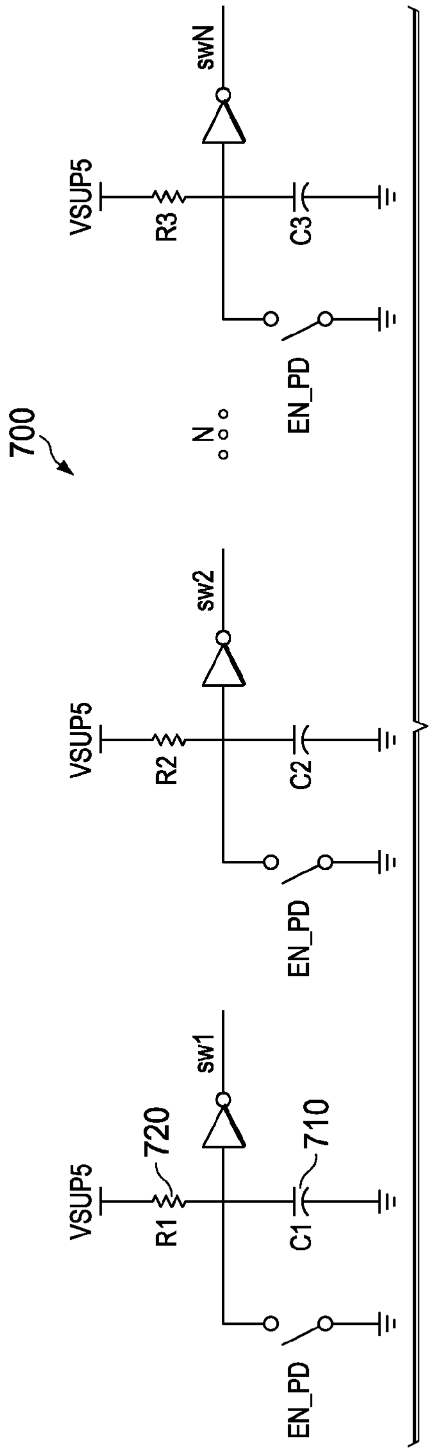
FIG. 7 illustrates an example of an alternative delay circuit for a sequential switching configuration for a dynamic current pull-down block that is employed to mitigate transients at the output of a voltage regulator.

FIG. 7 illustrates an example of an alternative delay circuit for a sequential switching configuration for a dynamic current pull-down block 700 that is employed to mitigate transients at the output of a voltage regulator. In this example, a capacitor at 710 and resistor at 720 can set a time delay for the first switch SW1. In the succeeding stages of the block 700, the resistor and capacitive time constants can be changed to provide a longer delay in the subsequent stages. In some examples, the capacitor value of the subsequent stages can be changed. In another example, the resistor value in the subsequent stages can be changed. In yet another example, both the resistor and the capacitor values in the subsequent stages can be changed to provide an ever increasing delay time in the subsequent stages.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A circuit comprising:

a comparator to monitor a transient with respect to a predetermined threshold at the output of a voltage regulator and to generate a compensation signal if the transient exceeds the predetermined threshold; and a dynamic current pull-down block that is triggered from the compensation signal of the comparator and operative with an output stage of the voltage regulator to mitigate the transient at the output of the voltage regulator by concurrently activating a plurality of current pull-down switches during the transient and sequentially deactivating each current pull-down switch of the plurality of current pull-down switches after its predetermined deactivation delay for each current pull-down switch;

further comprising an error amplifier to generate an error output voltage with respect to an input reference voltage of the voltage regulator and an output stage to receive the error output voltage of the error amplifier and to generate a control signal for the voltage regulator.

2. The circuit of claim 1, further comprising a pass device to supply a regulated output voltage to an output of the voltage regulator in response to the control signal received from the output stage.

3. The circuit of claim 2, wherein the dynamic current pull-down block sinks current from the output stage when triggered from the compensation signal of the comparator to mitigate the transient at the output of the voltage regulator.

4. The circuit of claim 2, further comprising a second dynamic current pull-down block to sink current from the error amplifier when triggered from the compensation signal of the comparator to mitigate the transient at the output of the voltage regulator.

5. The circuit of claim 2, further comprising a switch to sink current from the error amplifier when triggered from the compensation signal of the comparator to mitigate the transient at the output of the voltage regulator.

6. The circuit of claim 1, wherein the dynamic current pull-down block includes N switches, with each switch configured to sink current IPD, with each switch having a delay D, where N is a positive integer, IPD is an amount of current, and D is an amount of time.

7. The circuit of claim 1, wherein the dynamic current pull-down block sinks a maximum current of N×IPD when the transient is detected and each switch is sequentially deactivated over a time defined by 1×D to gradually reduce the overall sink current of the dynamic current pull-down block.

8. The circuit of claim 7, wherein the time D is set by a capacitor and a current source or by a resistor and a capacitor time constant.

9. A circuit comprising:

an error amplifier to generate an error output voltage with respect to an input reference voltage of a voltage regulator;

an output stage to receive the error output voltage of the error amplifier and to generate a control signal for the voltage regulator;

a pass device to supply a regulated output voltage to an output of the voltage regulator in response to the control signal received from the output stage;

a comparator to monitor a transient with respect to a predetermined threshold at the output of the voltage regulator and to generate a compensation signal if the transient exceeds the predetermined threshold; and a dynamic current pull-down block that is triggered from the compensation signal of the comparator and operative with the output stage to mitigate the transient at the output of the voltage regulator by concurrently activating a plurality of current pull-down switches during the transient and sequentially deactivating each current pull-down switch of the plurality of current pull-down switches after its predetermined deactivation delay for each current pull-down switch.

10. The circuit of claim 9, further comprising a second dynamic current pull-down block to sink current from the error amplifier when triggered from the compensation signal of the comparator to mitigate the transient at the output of the voltage regulator.

11. The circuit of claim 9, further comprising a switch to sink current from the error amplifier when triggered from the compensation signal of the comparator to mitigate the transient at the output of the voltage regulator.

12. The circuit of claim 9, wherein the dynamic current pull-down block includes N switches, with each switch configured to sink current IPD, with each switch having a delay D, where N is a positive integer, IPD is an amount of current, and D is an amount of time.

13. The circuit of claim 12, wherein the dynamic current pull-down block sinks a maximum current of N×IPD when the transient is detected and each switch is sequentially deactivated over a time defined by 1×D to gradually reduce the overall sink current of the dynamic current pull-down block.

14. The circuit of claim 13, wherein the time D is set by a capacitor and a current source or by a resistor and a capacitor time constant.

15. An integrated circuit comprising:

an error amplifier to generate an error output voltage with respect to an input reference voltage of a voltage regulator;

an output stage to receive the error output voltage of the error amplifier and to generate a control signal for the voltage regulator;

a pass device to supply a regulated output voltage to an output of the voltage regulator in response to the control signal received from the output stage;

a comparator to monitor a transient with respect to a predetermined threshold at the output of the voltage regulator and to generate a compensation signal if the transient exceeds the predetermined threshold;

a first dynamic current pull-down block that is triggered from the compensation signal of the comparator and operative with the output stage to mitigate the transient at the output of the voltage regulator; and a second dynamic current pull-down block that is triggered from the compensation signal of the comparator and operative with the error amplifier to mitigate the transient at the output of the voltage regulator, wherein each of the first and second dynamic current pull-down blocks activate a plurality of current pull-down switches during the transient and sequentially deactivate each current pull-down switch of the plurality of current pull-down switches after its predetermined deactivation delay for each current pull-down switch.

16. The circuit of claim 15, wherein each of the first and second the dynamic current pull-down blocks includes N switches, with each switch configured to sink current IPD, with each switch having a delay D, where N is a positive integer, IPD is an amount of current, and D is an amount of time.

17. The circuit of claim 16, wherein each of the first and second dynamic current pull-down blocks sinks a maximum current of N×IPD when the transient is detected and each switch is sequentially deactivated over a time defined by 1×D to gradually reduce the overall sink current of the dynamic current pull-down block.

18. The circuit of claim 17, wherein the time D is set by a capacitor and a current source or by a resistor and a capacitor time constant.

* * * * *